United States Patent
Padmanabhan et al.

(10) Patent No.: US 12,033,431 B2
(45) Date of Patent: Jul. 9, 2024

(54) FACIAL ENROLLMENT AND RECOGNITION SYSTEM

(71) Applicant: Honeywell International Inc., Charlotte, NC (US)

(72) Inventors: Aravind Padmanabhan, Plymouth, MN (US); Tomas Brodsky, Cortlandt Manor, NY (US); Yunting Lin, White Plains, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/197,689

(22) Filed: May 15, 2023

(65) Prior Publication Data

US 2023/0282027 A1 Sep. 7, 2023

Related U.S. Application Data

(63) Continuation of application No. 17/371,343, filed on Jul. 9, 2021, now Pat. No. 11,688,202, which is a
(Continued)

(51) Int. Cl.
*G06V 40/16* (2022.01)
*G06F 16/583* (2019.01)
(Continued)

(52) U.S. Cl.
CPC ........ *G06V 40/172* (2022.01); *G06F 16/5838* (2019.01); *G06V 20/46* (2022.01); *G06V 20/52* (2022.01); *G06V 40/161* (2022.01)

(58) Field of Classification Search
CPC ...... G06V 40/172; G06V 20/46; G06V 20/52; G06V 40/161; G06F 16/5838; G06F 16/58
See application file for complete search history.

(56) References Cited

U.S. PATENT DOCUMENTS

| 6,052,666 | A | 4/2000 | Diehl et al. |
| 6,236,749 | B1 * | 5/2001 | Satonaka ............... G06F 18/213 |
| | | | 382/250 |

(Continued)

FOREIGN PATENT DOCUMENTS

| AU | 2017210578 A1 | 8/2017 |
| EP | 986808 B1 | 2/2002 |
| WO | 9855992 A1 | 12/1998 |

OTHER PUBLICATIONS

Jaturawat, P., et al., "An Evaluation of Face Recognition Algorithms and Accuracy based on Video in Unconstrained Factors", 2016 6th IEEE International Conference on Control System, Computing and Engineering, Nov. 25-27, 2016, Pengang, Malaysia.
(Continued)

*Primary Examiner* — Xuemei G Chen
(74) *Attorney, Agent, or Firm* — Seager, Tufte & Wickhem, LLP

(57) ABSTRACT

A facial recognition system includes a memory for storing a facial image database, wherein the facial image database includes a plurality of entries each corresponding to a different person, and wherein each entry includes a person identifier along with one or more facial images of the person. The facial recognition system further includes a facial recognition module that is operatively coupled to the memory. The facial recognition module is configured to receive a new facial image, and to select one or more facial recognition engines based on one or more facial image parameters of the new facial image, and to use the selected facial recognition engines to compare the new facial image with facial models that are based upon facial images stored in the facial image database in order to identify the person in the new facial image.

14 Claims, 7 Drawing Sheets

Related U.S. Application Data continuation of application No. 15/964,220, filed on Apr. 27, 2018, now abandoned.

(51) Int. Cl.
*G06V 20/40* (2022.01)
*G06V 20/52* (2022.01)

(56) References Cited

U.S. PATENT DOCUMENTS

| | | | |
|---|---|---|---|
| 6,408,272 B1 | 6/2002 | White et al. | |
| 6,876,755 B1* | 4/2005 | Taylor | G06V 40/169 |
| | | | 340/5.83 |
| 7,031,438 B1 | 4/2006 | Cheston, III et al. | |
| 7,447,635 B1 | 11/2008 | Konopka et al. | |
| 7,783,082 B2 | 8/2010 | Koshizen et al. | |
| 7,806,604 B2 | 10/2010 | Bazakos et al. | |
| 7,831,426 B2 | 11/2010 | Bennett | |
| 7,933,777 B2 | 4/2011 | Koll | |
| 7,957,974 B2 | 6/2011 | Cho et al. | |
| 8,266,078 B2 | 9/2012 | Zou et al. | |
| 8,321,444 B2 | 11/2012 | Mowatt et al. | |
| 8,340,975 B1 | 12/2012 | Rosenberger | |
| 8,346,794 B2 | 1/2013 | Cheng et al. | |
| 8,396,710 B2 | 3/2013 | White et al. | |
| 8,666,963 B2 | 3/2014 | Sejnoha et al. | |
| 8,818,789 B2 | 8/2014 | Abir | |
| 8,831,957 B2 | 9/2014 | Taubman et al. | |
| 8,849,259 B2 | 9/2014 | Rhoads et al. | |
| 8,861,804 B1* | 10/2014 | Johnson | G06F 16/587 |
| | | | 382/218 |
| 8,868,428 B2 | 10/2014 | Gruenstein et al. | |
| 8,873,853 B2 | 10/2014 | Rodriguez | |
| 8,953,852 B2 | 2/2015 | Huang et al. | |
| 8,995,729 B2 | 3/2015 | Marques et al. | |
| 9,058,390 B2 | 6/2015 | Barve et al. | |
| 9,251,402 B2 | 2/2016 | Sun et al. | |
| 9,275,269 B1 | 3/2016 | Li et al. | |
| 9,472,205 B2 | 10/2016 | Kolavennu et al. | |
| 9,495,962 B2 | 11/2016 | Govrin et al. | |
| 9,542,956 B1 | 1/2017 | Nostrant | |
| 9,613,258 B2* | 4/2017 | Chen | G06V 40/169 |
| 9,696,055 B1* | 7/2017 | Goodman | F24F 11/62 |
| 9,875,741 B2 | 1/2018 | Gelfenbeyn et al. | |
| 9,996,773 B2* | 6/2018 | Asati | G06V 10/7715 |
| 10,559,302 B2* | 2/2020 | Beifuss | G06F 3/017 |
| 10,679,443 B2* | 6/2020 | Grigorov | H04N 5/33 |
| 11,144,817 B2* | 10/2021 | Sun | G06N 3/045 |
| 11,205,236 B1* | 12/2021 | Smith | G06N 3/08 |
| 2002/0069063 A1 | 6/2002 | Buchner et al. | |
| 2002/0136435 A1* | 9/2002 | Prokoski | G06V 40/45 |
| | | | 382/118 |
| 2003/0007669 A1* | 1/2003 | Martinez | G06V 40/172 |
| | | | 382/118 |
| 2003/0093272 A1 | 5/2003 | Soufflet et al. | |
| 2003/0187659 A1 | 10/2003 | Cho et al. | |
| 2004/0193603 A1 | 9/2004 | Ljubicich | |
| 2005/0060276 A1* | 3/2005 | Nielsen | G06F 16/58 |
| | | | 707/E17.022 |
| 2005/0147291 A1* | 7/2005 | Huang | G06V 40/172 |
| | | | 382/218 |
| 2005/0147292 A1* | 7/2005 | Huang | G06F 18/254 |
| | | | 382/218 |
| 2005/0149496 A1 | 7/2005 | Mukherjee et al. | |
| 2006/0072791 A1* | 4/2006 | Gutta | G05B 15/02 |
| | | | 340/5.83 |
| 2007/0104362 A1* | 5/2007 | Hwang | G06V 40/169 |
| | | | 382/118 |
| 2007/0288129 A1 | 12/2007 | Komer et al. | |
| 2008/0147397 A1 | 6/2008 | Konig et al. | |
| 2009/0310828 A1* | 12/2009 | Kakadiaris | G06V 40/168 |
| | | | 382/118 |
| 2010/0030734 A1 | 2/2010 | Chunilal | |
| 2010/0066822 A1* | 3/2010 | Steinberg | G06V 40/173 |
| | | | 382/118 |
| 2010/0111377 A1 | 5/2010 | Monroe | |
| 2010/0286985 A1 | 11/2010 | Kennewick et al. | |
| 2011/0135165 A1* | 6/2011 | Wechsler | G06F 18/211 |
| | | | 382/118 |
| 2011/0257985 A1* | 10/2011 | Goldstein | G06F 16/3334 |
| | | | 707/812 |
| 2012/0059658 A1 | 3/2012 | Sejnoha et al. | |
| 2012/0232886 A1 | 9/2012 | Capuozzo et al. | |
| 2012/0233159 A1* | 9/2012 | Datta | G06F 16/24578 |
| | | | 707/E17.014 |
| 2012/0314608 A1* | 12/2012 | Okuno | H04L 67/10 |
| | | | 370/252 |
| 2013/0031476 A1 | 1/2013 | Coin et al. | |
| 2013/0236068 A1* | 9/2013 | Eshghi | G06V 40/172 |
| | | | 382/118 |
| 2014/0089236 A1* | 3/2014 | Lee | G06V 10/774 |
| | | | 706/12 |
| 2014/0135997 A1* | 5/2014 | Bradley | F24F 11/30 |
| | | | 700/278 |
| 2014/0223465 A1 | 8/2014 | Hatambeiki et al. | |
| 2014/0375782 A1* | 12/2014 | Chichilnisky | G06T 11/001 |
| | | | 348/62 |
| 2014/0379323 A1 | 12/2014 | Anastasakos et al. | |
| 2015/0088518 A1 | 3/2015 | Kim et al. | |
| 2015/0186748 A1* | 7/2015 | Cootes | G06F 18/24323 |
| | | | 382/201 |
| 2015/0277681 A1 | 10/2015 | Isaacson et al. | |
| 2015/0278584 A1* | 10/2015 | Nakano | G06V 40/172 |
| | | | 382/118 |
| 2015/0294139 A1* | 10/2015 | Thompson | G06F 21/32 |
| | | | 382/112 |
| 2015/0317511 A1 | 11/2015 | Li et al. | |
| 2015/0348551 A1 | 12/2015 | Gruber et al. | |
| 2016/0086015 A1* | 3/2016 | Irmatov | G06F 18/2148 |
| | | | 382/103 |
| 2016/0203305 A1* | 7/2016 | Suh | G06V 40/172 |
| | | | 382/118 |
| 2016/0335264 A1 | 11/2016 | Behal et al. | |
| 2017/0024465 A1 | 1/2017 | Yeh et al. | |
| 2017/0094134 A1* | 3/2017 | Lunn | H04N 23/51 |
| 2017/0161268 A1 | 6/2017 | Badaskar | |
| 2018/0121716 A1* | 5/2018 | Sun | G06V 40/165 |
| 2018/0285629 A1* | 10/2018 | Son | G06V 10/809 |
| 2019/0012442 A1* | 1/2019 | Hunegnaw | G06F 21/10 |
| 2019/0147676 A1* | 5/2019 | Madzhunkov | G06F 21/32 |
| | | | 340/5.2 |
| 2019/0370613 A1* | 12/2019 | Arngren | G06V 10/95 |
| 2020/0057885 A1* | 2/2020 | Rao | G06V 40/172 |
| 2020/0134954 A1* | 4/2020 | Yi | G07C 9/23 |
| 2020/0167583 A1* | 5/2020 | Yoon | G06V 40/161 |
| 2020/0209950 A1* | 7/2020 | Liu | G06F 3/011 |
| 2021/0157331 A1* | 5/2021 | He | G05D 1/0219 |

OTHER PUBLICATIONS

The European Search Report for EP Application No. 14165437.6, dated Aug. 7, 2014.

Dreilinger et al., "Experiences with Selecting Search Engines Using Metasearch," ACM Transactions on Information Systems, vol. 15, Nov. 3, pp. 195-222, Jul. 1997.

http://federatedsearchblog.com/2009/01/30/steven-bell-On-the-future-of-federated-search/, "Steven Bell on the Future of Federated Search," 3 pages, printed Feb. 7, 2017.

https://en.wikipedia.org/wiki/Federated_search, "Federated Search, From Wikipedia, the Free Encyclopedia," 4 pages, printed Feb. 7, 2017.

https: 1/en.wikipedia.org/wiki/Search_aggregator, "Search Aggregator, From Wikipedia, the Free Encyclopedia," 2 pages, printed Mar. 27, 2017.

Yambor, et al., "Analyzing PCA-based Face Recognition Algorithms: Eigenvector Selection and Distance Measures," Colorado State University, 14 pages, Jul. 1, 2000.

(56) References Cited

OTHER PUBLICATIONS

Face Recognition Homepage-Algorithms, 9 pages, Mar. 5, 2017.
Marques, "Face Recognition Algorithms," 78 pages, Jun. 16, 2010.

\* cited by examiner

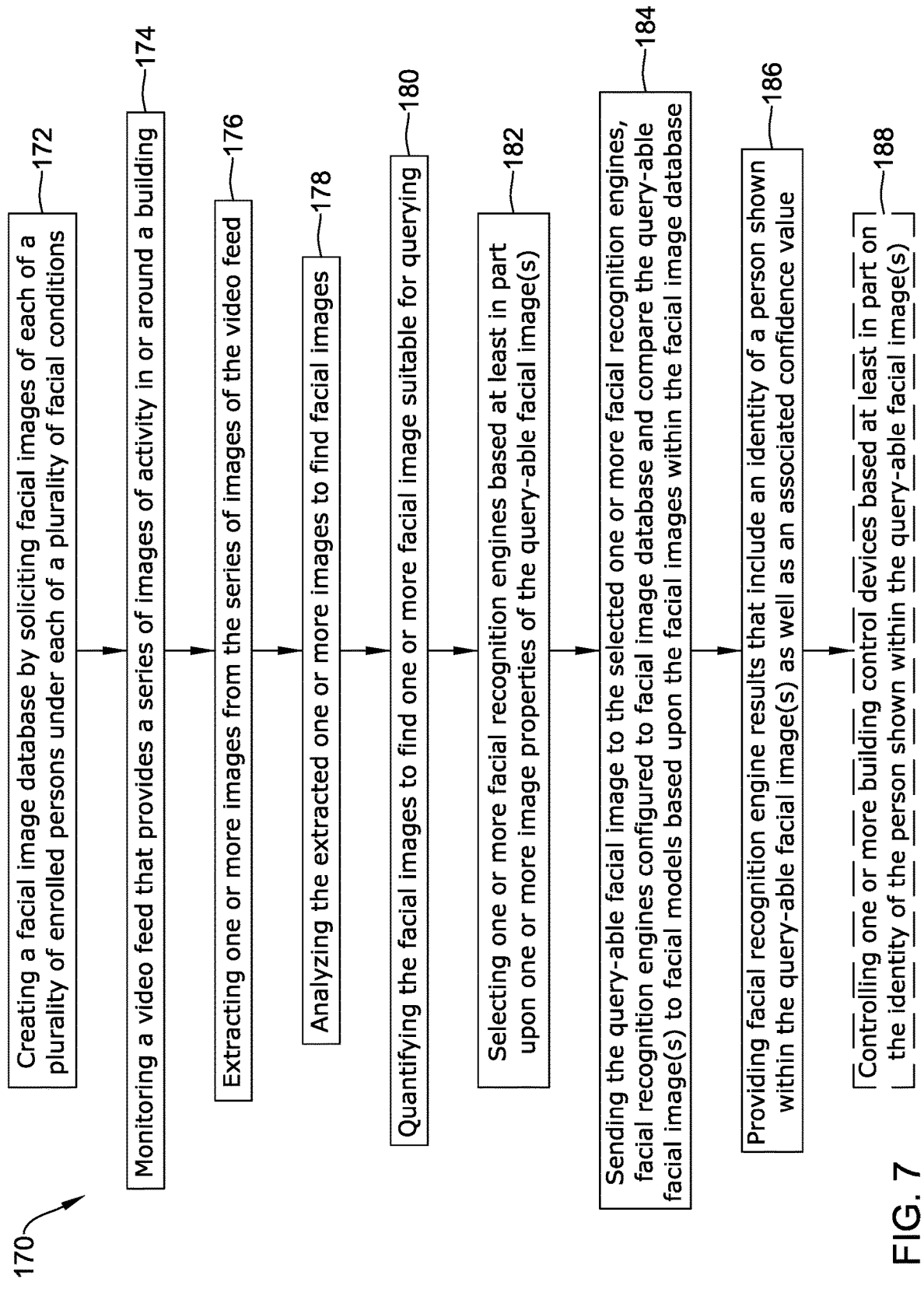

FACIAL ENROLLMENT AND RECOGNITION SYSTEM

This is a continuation of co-pending U.S. patent application Ser. No. 17/371,343, filed Jul. 9, 2021, and entitled "FACIAL ENROLLMENT AND RECOGNITION SYSTEM", which is a continuation of U.S. patent application Ser. No. 15/964,220, filed Apr. 27, 2018, and entitled "FACIAL ENROLLMENT AND RECOGNITION SYSTEM", both of which are incorporated herein by reference.

BACKGROUND

The present disclosure relates generally to facial recognition systems, and more particularly, to facial recognition systems that employ a facial recognition engine to compare a facial image with a representation that is based upon facial images stored in a facial image database created and maintained by the facial recognition system.

SUMMARY

The disclosure relates to facial recognition systems that employ one or more facial recognition engines to compare a facial image with a representation that is based upon facial images stored in a facial image database created and maintained by the facial recognition system. In some instances, the facial recognition system may be configured to monitor still and/or video sources capturing facial images of individuals within a space, and then utilize one or more facial recognition engines to identify the individuals within the space. In some cases, the facial recognition system may report back to a building automation system with the identity of the individuals seen within the space so that the building automation system may take appropriate action. For example, if the building automation system includes an HVAC system, the HVAC system may change a temperature set point in response to being informed that a particular person has arrived home. If the building automation system includes a security system, the security system may unlock a door of a building in response to being informed that a particular authorized person is present at the door. These are just examples.

A particular example of the disclosure is a facial recognition system that includes an input, an output and a memory for storing a facial image database that includes a plurality of entries each corresponding to a different person, and wherein each entry includes a person identifier along with one or more facial images of the person. The system includes a facial recognition module that is operably coupled to the memory, the input and the output. The facial recognition module is configured to receive a new facial image via the input and to ascertain one or more facial image parameters from the new facial image, and then select a subset of facial recognition engines from a larger set of available facial recognition engines based at least in part on one or more of the ascertained facial image parameters. The ascertained facial image parameters may include, for example, the size of the facial image in pixels, a relative brightness of the facial image, a relative contrast of the facial image, a relative back lighting of the facial image, a relative blurriness of the facial image and/or any other suitable image parameter(s). In some cases, the ascertained facial image parameters may include whether the captured image shows the individual looking directly at the camera, or up or down and/or to the left or to the right. In some cases, the ascertained facial image parameters may include whether and/or how much of the face is obstructed by a hat, hair, glasses or other object. Some facial recognition engines may perform better on facial images under certain facial image parameters than other facial recognition engines. In any event, each of the selected facial recognition engines may compare the new facial image to facial representations that are based upon the facial images in the facial image database to try to identify the person identifier that likely corresponds to the new facial image. The facial recognition module may then send a person ID to a control module via the output, wherein the control module may control one or more building control devices based at least in part on the person ID (e.g. change a setpoint, unlock a door, etc.).

Another example of the disclosure includes a method of recognizing individuals within a building space. Access is gained to a facial image database that includes a plurality of enrolled persons, where the facial image database includes a facial image for each of the plurality of enrolled persons under each of a plurality of different facial conditions. One or more video feeds are monitored that provide images of spaces within the building space, at least some of the images including images of persons within the building space. The one or more video feeds are processed to detect one or more facial images of a person within the building space and one or more facial recognition engines may be selected to compare the detected facial image with facial models that are based on the facial images in the facial image database. Selecting the one or more facial recognition engines is based at least in part on one or more image criteria of the detected facial image. An identified one of the plurality of enrolled persons included in the facial image database that is identified in the detected facial image may be received from the selected one or more facial recognition engines and the identified one of the plurality of enrolled persons may be reported to a building automation system. One or more building control devices of the building automation system may be controlled based at least in part on the identified one of the plurality of enrolled persons.

Another example of the disclosure includes a method of identifying an individual. The method includes monitoring a video feed that provides a series of images of activity in or around a building and extracting one or more images from the series of images of the video feed. The extracted one or more images are analyzed to find facial images, and the facial images are quantified to find a query-able facial image. One or more facial recognition engines are selected based at least in part upon one or more image properties of the query-able facial image. The query-able facial image is sent to the selected one or more facial recognition engines. The selected one or more facial recognition engines are configured to compare the query-able facial image with facial models that are based upon facial images within the facial image database. Facial recognition engine results are provided that include an identity of a person shown within the query-able facial image (if the person is present in the facial image database) and in some cases an associated confidence value. One or more building control devices may then be controlled based at least in part on the identity of the person shown within the query-able facial image.

The above summary of some illustrative embodiments is not intended to describe each disclosed embodiment or every implementation of the present disclosure. The Figures, and Description, which follow, more particularly exemplify some of these embodiments.

BRIEF DESCRIPTION OF THE FIGURES

The disclosure may be more completely understood in consideration of the following description in connection with the accompanying drawings, in which:

FIG. 7 is a flow diagram showing an illustrative method of identifying an individual.

Figure 1:
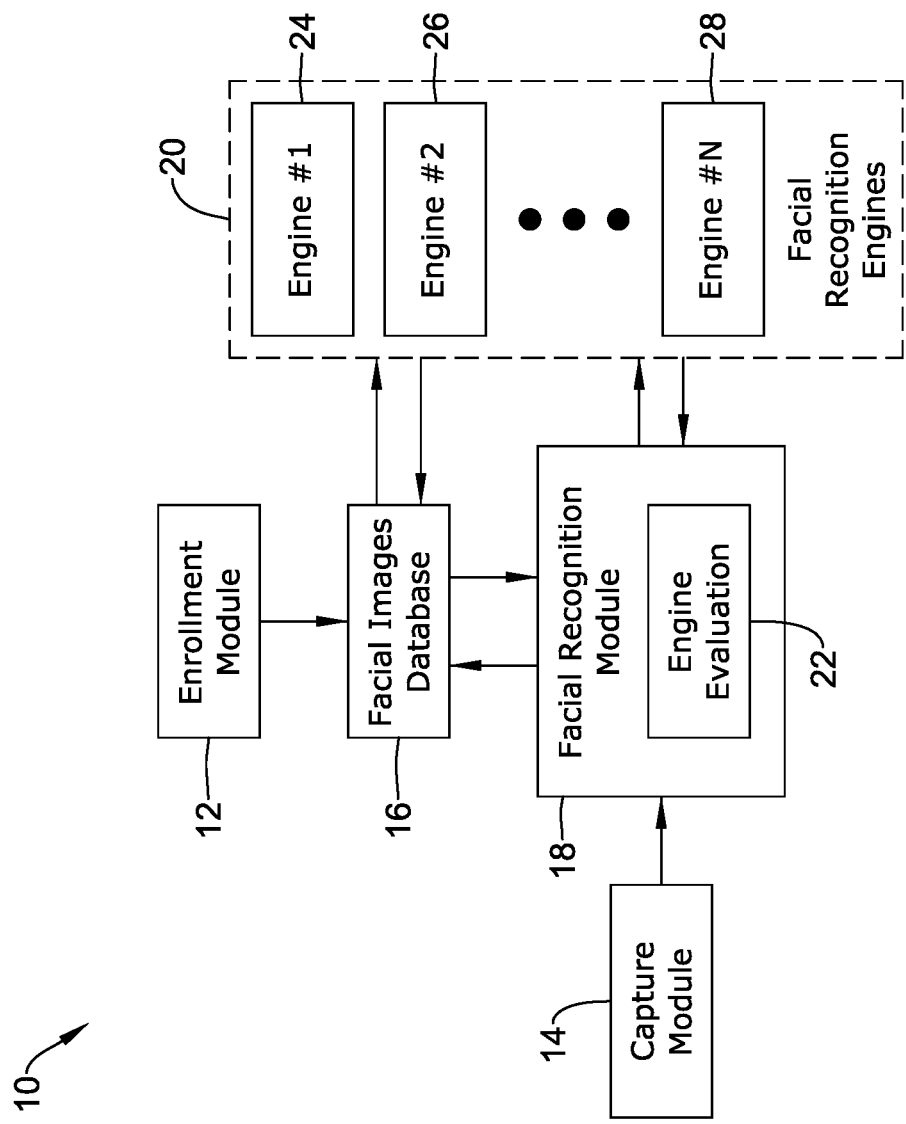
FIG. 1 is a schematic block diagram of an illustrative facial recognition system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

FIG. 1 is a schematic block diagram of an illustrative facial recognition system 10 that may, for example, be configured to create and update a database of facial images and to use that database of facial images to identify an individual. In cases, the facial recognition system 10 includes an enrollment module 12 and a capture module 14. While illustrated as separate components, the enrollment module 12 and the capture module 14 may individually or in combination be manifested in a controller that may be part of a building automation system (e.g. an HVAC panel such as a thermostat, a security panel, etc.). In some cases, the enrollment module 12 and/or the capture module 14, or at least some functionally of one or both modules, may be manifested in a server or a cloud-based application. In some cases, the enrollment module 12 and/or the capture module 14, or at least some functionally of one or both modules, may be manifested in mobile device such as a tablet computer, laptop computer or smartphone. In some cases, the enrollment module 12 and/or the capture module 14, or at least some functionally of one or both modules, may be manifested in a desktop computer.

The enrollment module 12, may, for example, be responsible for creating and maintaining a facial images database 16. As will be discussed, the enrollment module 12 may obtain facial images from a variety of different sources and may in some cases analyze the facial images for quality before storing the facial images in the facial images database 16. In some cases, the enrollment module 12 may be responsible for periodically updating the facial images stored in the facial images database 16 to account for changing styles (hair styles, facial hair, glasses, etc.), aging and the like of the individuals in the facial images database 16.

The capture module 14 may be responsible for obtaining facial images of individuals to be identified. In some cases, the capture module 14 may receive live video of a space, and may analyze the live video to find facial images of persons to be identified. Once the capture module 14 finds one or more facial images of person(s) that are to be identified, the capture module 14 may provide the one or more facial images to a facial recognition module 18. One of the tasks of the facial recognition module 18 is to determine which of a variety of different facial recognition engines 20 are to be used to query the facial images database 16 in order to identify the persons in the one or more facial images. In some cases, which facial recognition engine 20 to use may be determined at least in part by one or more image parameters of the one or more facial images. In some cases, the facial recognition module 18 includes a facial recognition engine evaluation module 22 that determines which of the facial recognition engines 20 are to be used. In some cases, a single facial recognition engine 20 may be used. In other situations, two, three or more distinct facial recognition engines 20 may be used. In FIG. 1, the facial recognition engines 20 include an ENGINE #1 labeled as 24, an ENGINE #2 labeled as 26 through an ENGINE #N labeled as 28.

The facial recognition engine evaluation module 22 may analyze a facial image to determine one or more image parameters of the facial image, and may utilize the one or more image parameters to determine which of the facial recognition engines 20 should be used in order to identify the person shown in the facial image. In some instances, the facial recognition engine evaluation module 22 (or the facial recognition module 18 itself) may evaluate multiple images of a particular individual (e.g. multiple images of a video sequence) to determine which of the multiple images are most likely to provide good results. In some cases, the image parameters may include, for example, the size of the facial image in pixels, a relative brightness of the facial image, a relative contrast of the facial image, a relative back lighting of the facial image, a relative blurriness of the facial image, and/or any other suitable image parameter(s). In some cases, the image parameters may include whether the captured image shows the individual looking directly at the camera, or up or down and/or to the left or to the right. In some cases, the image parameters may include whether and/or how much of the face is obstructed by a hat, hair, glasses or other object. The engine evaluation model may store a table that maps certain image parameters to certain facial recognition engines 20.

In some cases, a specific facial recognition engine 20 may be selected if the image parameters fall within a range suitable for that facial recognition engine 20. The suitable range thresholds may be selected manually based on engine specifications, or may be based upon prior testing performed on a sample of facial images. In some cases, the suitable range thresholds may also be selected automatically, and may be adjusted over time, based on comparison of different facial recognition engine results on facial images processed by the system. Examples are shown in Table One, below:

TABLE ONE

| Image Parameter | Engine A Range | Engine B Range | Engine C Range |
| --- | --- | --- | --- |
| Face size (pixels) | 40 to 90 | 120 to unlimited | 60 to unlimited |
| Face Contrast | 0.9 to 1.0 | 0.5 to 1.0 | 0.8 to 1.0 |
| Face Orientation tilt | −20° to +20° | −30° to +30° | −40° to +40° |
| Facial Occlusion | no occlusion of facial landmarks | eye occlusion allowed (glasses) | mouth and forehead occlusion allowed |

It will be appreciated that these are just examples, and a variety of other image parameters may be considered. For each facial recognition engine, the input parameters may be described as a range, as specific values, or a specific set of conditions. In some cases, a weighed sum combining various parameters may also be considered. For example, if the face size for a particular facial image is between 40 and 90 pixels, facial sharpness needs to be greater than or equal to 0.8; and if the face size is greater than 90 pixels, facial sharpness needs to be greater than or equal to 0.7.

A variety of commercially available facial recognition engines may be utilized. Examples of suitable cloud-based APIs (Application Programming Interface) for facial recognition include but are not limited to Microsoft Face API and Amazon Rekognition. Examples of suitable facial recognition engines that may be employed as on-site software or be integrated into other products include but are not limited to NEC Face Recognition, Morpho Argus and Cognitec.

Once the facial recognition engine evaluation module 22 determines which of the facial recognition engines 20 to select (often a subset of a larger set of available facial engines 20), the facial recognition module 18 may provide the selected facial recognition engine(s) 20 with the facial image. In some cases, one or more of the facial recognition engines 20 may be hosted on a remote server, but this is not required. Upon querying, the selected facial recognition engine(s) 20 may return an identity of the person shown in the facial image(s) that was sent to the selected facial recognition engine(s) 20. The selected facial recognition engine(s) 20 may also return a confidence value that provides an indication of how confident (i.e. likely) that the identity of the person is correct. For example, if the best available facial image sent to the selected facial recognition engine(s) is poorly lit and blurry, the confidence value may be relatively low. Conversely, if the best available facial image sent to the selected facial recognition engine(s) 20 is well-light and clear, and is an image of the individual looking directly or nearly directly at the camera, the confidence value may be relatively high.

Figure 2:
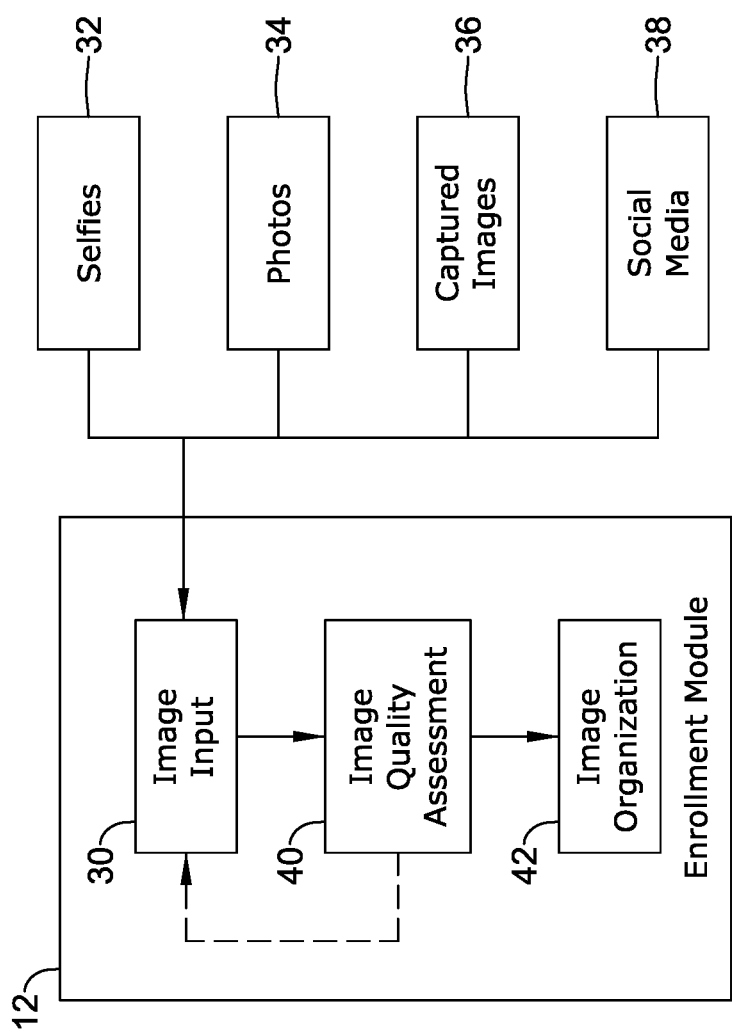
FIG. 2 is a schematic block diagram of an illustrative enrollment module forming a portion of the facial recognition system of FIG. 1.

FIG. 2 is a schematic block diagram of an illustrative enrollment module 12. As noted, a function of the enrollment module 12 is to obtain facial images that may be placed in the facial images database 16 (FIG. 1) and subsequently used to build or update a facial model based upon facial images in the facial images database 16 in order to identify persons in captured facial images. In some instances, the enrollment module 12 includes an image input module 30. The image input module 30 may obtain facial images from a variety of different sources. Examples of suitable image sources include a selfies module 32, a photos module 34, a captured images module 36 and a social media module 38. In some cases, the selfies module 32 may instruct individuals who are expected to be in the building space and are enrolling in the facial recognition system to take a series of selfies. For example, the individuals may be instructed to take and upload selfies showing themselves, or at least their faces, looking directly at the camera, looking left, looking right, looking up and looking down. In some cases, the selfies module 32 may instruct the individual to take multiple selfies with their hair up and their hair down, with and without facial jewelry like earrings, nose piercings, lip piercings, and/or various glasses, for example. In some cases, the selfies module 32 may be implemented, at least in part, on a mobile device such as a smartphone or tablet computer, but this is not required.

In some cases, the photos module 34 may be configured to go through online and/or otherwise electronic photo libraries looking for suitable facial images. These can include photo libraries stored on a personal computer, on the cloud, on a mobile device, and/or any other device. The photos module 34 may assemble multiple facial images for a particular individual, may display the multiple facial images, and ask the individual to confirm that each of the images is in fact of that individual. In some instances, the captured images module 36 may include or otherwise be operably coupled with a still camera, a video camera and the like, and may capture facial images as individuals move about the space. The captured images module 36 may compile these images, and in some cases may ask the individuals to confirm their identity.

The social media module 38 may scan social media accounts, such as but not limited to Facebook, Snapchat and the like, looking for suitable facial images of an individual. In some cases, the social media module 38 may display the found images and ask for identity confirmation.

In some cases, the enrollment module 12 may include an image quality assessment module 40 that receives facial images from the image input module 30 and analyzes the received facial images to confirm that the images are of sufficient quality to be of use. The facial images that are believed to be of sufficient quality, and represent a suitable variety of poses and images (looking left, looking right, etc.) may be passed on to an image organization module 42. In some cases, a particular facial image pose may be determined to be of less-than sufficient quality, and the image quality assessment module 40 may ask the image input module 30 to obtain a higher quality facial image of that particular facial image pose if possible.

Facial images that are deemed to be of sufficient quality, and of appropriate facial poses, are forwarded to the image organization module 42. In some cases, the image organization module 42 may at least partially contribute to the organization of facial images within the facial images database 16 (FIG. 1). Facial images may be organized in any suitable manner. In some cases, for example, the facial images for a particular individual may include images of the individual looking directly at the camera, images of the individual looking above the camera, images of the individual looking below the camera, images of the individual looking to the left of the camera, and images of the individual looking to the right of the camera. In some cases, facial images for a particular individual may be organized by whether they are wearing their hair up or down, have facial hair or are clean-shaven, whether or not they are wear jewelry, glasses and the like. In some cases, facial images for a particular individual may also be organized by the size of the facial image in pixels, the relative brightness of the facial image, the relative contrast of the facial image, the relative back lighting of the facial image, the relative blurriness of the facial image and/or by any other suitable image parameter. These are just examples.

Figure 3:
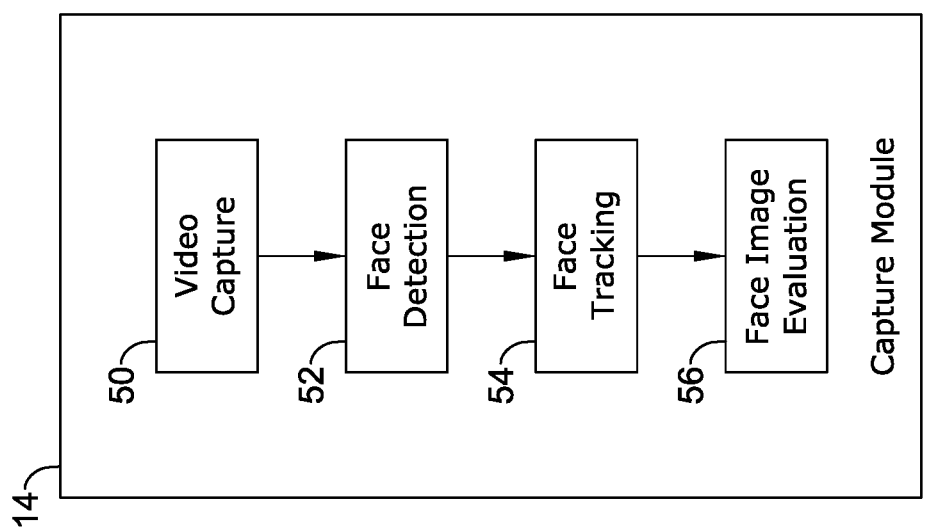
FIG. 3 is a schematic block diagram of an illustrative capture module forming a portion of the facial recognition system of FIG. 1.

FIG. 3 is a schematic block diagram of the capture module 14. While the capture module 14 is configured to capture facial images of individuals within a space so that they can be identified, in some cases, the capture module 14 may also assist the enrollment module 12 in initially capturing facial images for populating the facial images database 16 (FIG. 1). In some cases, the capture module 14 includes a video capture module 50. In some instances, the video capture module 50 may be operably coupled to one or more still cameras and/or video cameras that are distributed within a space. In some cases, still images may be captured by the still cameras and/or from image frames captured by the video cameras. In some cases, still images may be captured 30 times (frames) per second using a video camera, although this is just an example.

The still images may be forwarded to a face detection module 52, which analyzes the still images looking for facial images. Once a possible facial image is detected, in some cases, subsequent still images are analyzed by a face tracking module 54 looking for confirmation the individual is still there and/or looking for better quality facial images of that individual for subsequent identification. A face image evaluation module 56 may review the facial images to ascertain whether and which of the captured image(s) are of sufficient quality and/or pose to be of use in identifying the individual shown in the captured image(s).

Figure 4:
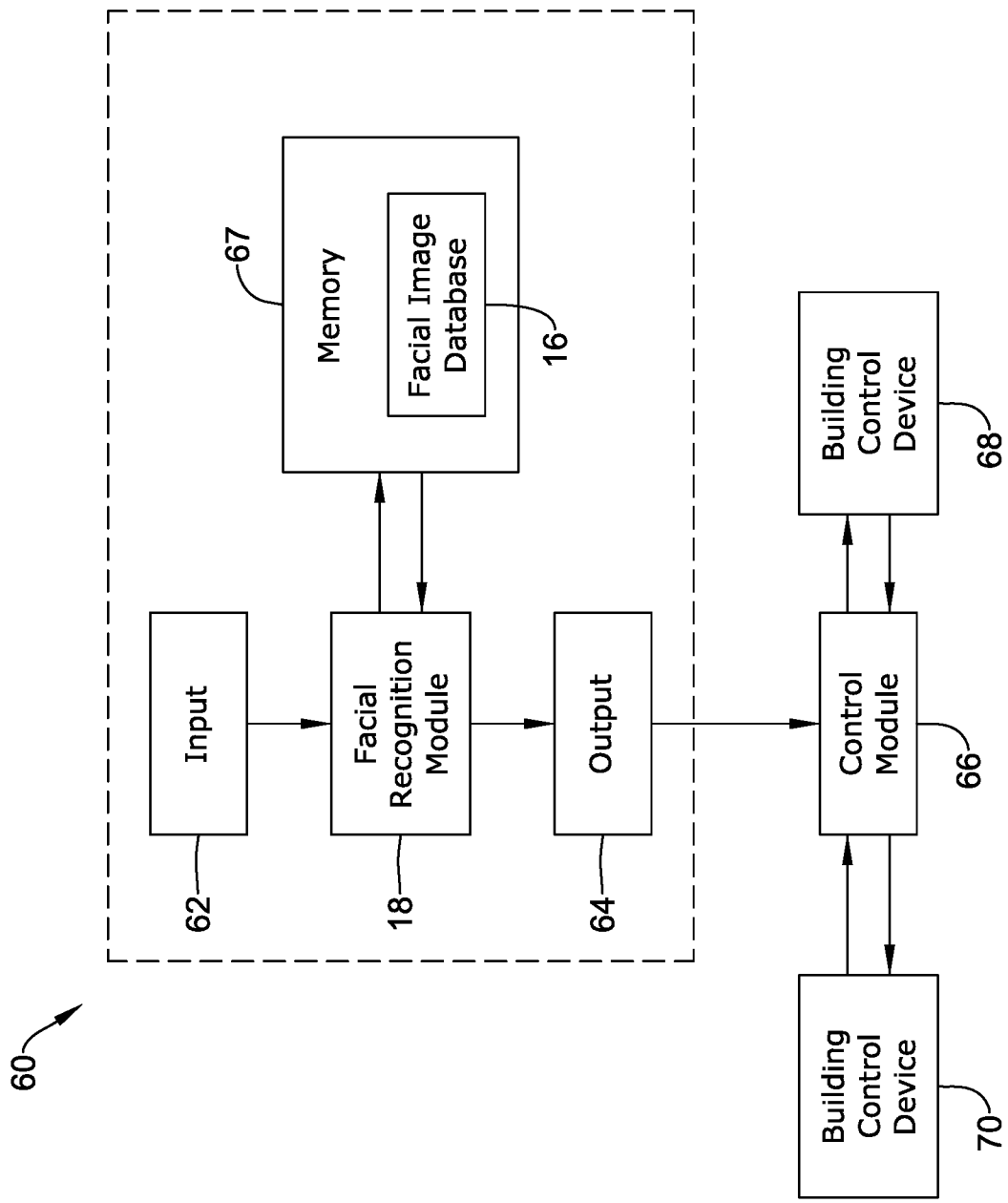
FIG. 4 is a schematic block diagram of an illustrative facial recognition system.

FIG. 4 is a schematic block diagram of an illustrative facial recognition system 60. The facial recognition system 60 includes an input 62 and an output 64. A memory 67 may be configured to store the facial images database 16. In some cases, the facial images database 16 includes a plurality of entries each corresponding to a different person, and each entry includes a person identifier along with one or more facial images of the person. In some instances, the facial images database 16 may include multiple facial images for each person identifier, with some of the multiple facial images representing the person at one or more of different facial angles, different facial lighting, different facial size in terms of pixels, and different facial obstructions. Examples of different facial obstructions include but are not limited to differing hair style, wearing glasses, not wearing glasses, wearing a hat, not wearing a hat, and differing ages.

The facial recognition module 18 is operably coupled to the input 62, the output 64 and to the memory 67 and is configured to receive a new facial image via the input 62 and to ascertain one or more facial image parameters from the new facial image. The facial recognition module 18 is configured to select a subset of facial recognition engines 20 (FIG. 1) from a larger set of available facial recognition engines 20 (FIG. 1) based at least in part on one or more of the ascertained facial image parameters. The ascertained facial image parameters may include, for example, the size of the facial image in pixels, a relative brightness of the facial image, a relative contrast of the facial image, a relative back lighting of the facial image, a relative blurriness of the facial image and/or any other suitable image parameter(s). In some cases, the ascertained facial image parameters may include whether the captured image shows the individual looking directly at the camera, or up or down and/or to the left or to the right. In some cases, the ascertained facial image parameters may include whether and/or how much of the face is obstructed by a hat, hair, glasses or other object.

At least some of the facial recognition engines 20 may include cloud-based facial recognition engines, but this is not required. In some cases, the selected subset of facial recognition engines 20 may include two or more distinct facial recognition engines 20. In some cases, the selected subset of facial recognition engines 20 may include only a single facial recognition engine 20.

Each of the facial recognition engines 20 is configured to compare the new facial image to facial models or other facial representations that are based upon the facial images in the facial image database 16 and to identify a person identifier that likely corresponds to the new facial image. The facial recognition module 18 may be configured to evaluate the person identifiers and confidence levels returned by the selected facial recognition engines 20. If the returned person identifiers are the same, the facial recognition module 18 will assign a high confidence to the output person ID. However, if the returned person identifiers differ, the facial recognition module 18 may output the person ID with the highest combined confidence, or may select additional facial recognition engines to evaluate the new facial image. In case of disagreement, the output person ID will be assigned lower confidence. The facial recognition module 18 is configured to send a person ID to a control module 66 via the output 64, wherein the control module 66 is configured to control one or more building control devices 68, 70 based at least in part on the person ID. In some cases, the facial recognition module 18 may be further configured to process the person identifiers identified by each of the subset of facial recognition engines 20 to determine the person ID that is sent to the control module 66.

In some cases, at least one of the facial recognition engines 20 may provide a confidence level of the person identifier that likely corresponds to the new facial image. In some cases, particularly if the new facial image was sent to multiple facial recognition engines 20 for identification, the facial recognition module 18 may be configured to determine a confidence level in the person ID that is based at least in part on the confidence level of the person identifier provided by each of one or more of the subset of facial recognition engines 20. In some cases, if the confidence level in the person ID is below a threshold confidence level, the facial recognition module 18 may select a different facial recognition engine 20, or a different subset of facial recognition engines 20, and may try again. This may be repeated until an acceptable confidence level is achieved. If an acceptable confidence level cannot be achieved, the facial recognition module 18 may report to the output module 64 that an unknown person was seen in the new facial image.

Figure 5:
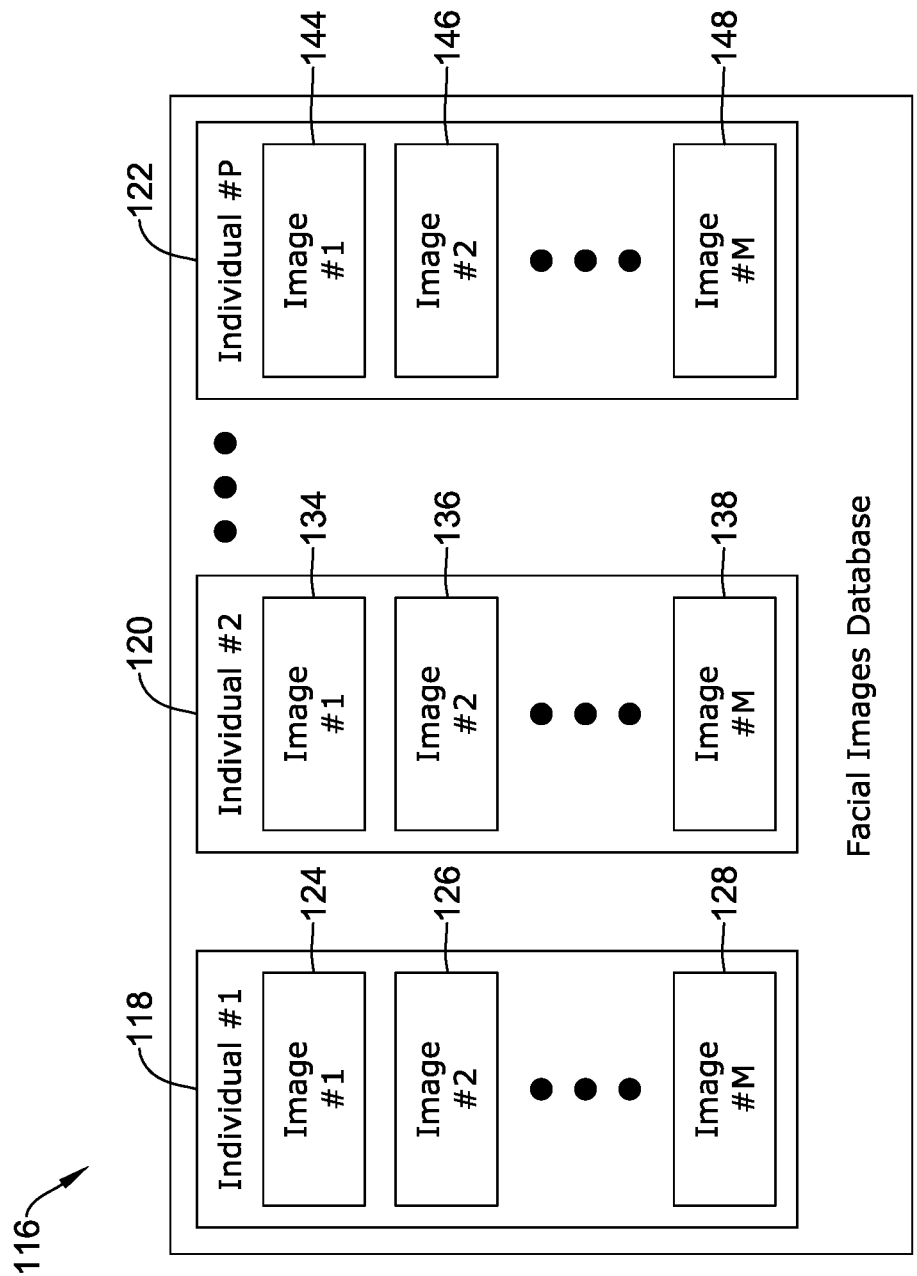
FIG. 5 is a schematic block diagram of an illustrative facial image database usable in the illustrative facial recognition systems of FIG. 1 and FIG. 4.

FIG. 5 is a schematic illustration of an illustrative facial images database 116. In some cases, the facial images database 116 may be considered as being an illustrative but non-limiting example of the facial images database 16. It will be appreciated that the information within the facial images database 16 may be organized in any suitable fashion. The facial images database 116 includes a plurality of facial images that are organized by individual. To illustrate, the facial images database 116 may include an INDIVIDUAL #1 labeled as 118, an INDIVIDUAL #2 labeled as 120 through an INDIVIDUAL #P labeled as 122. A number of facial images are organized underneath each individual 118, 120, 122. As illustrated, the individual 118 includes an IMAGE #1 labeled as 124, an IMAGE #2 labeled as 126 through an IMAGE #M labeled as 128. Similarly, the individual 120 includes an IMAGE #1 labeled as 134, an IMAGE #2 labeled as 136 through an IMAGE #M labeled as 138 and the individual 122 includes an IMAGE #1 labeled as 144, an IMAGE #2 labeled as 146 through an IMAGE #M labeled as 148.

In some cases, the images for each individual 118, 120, 122 may be organized in a similar fashion. For example, the image 124 may represent a straight on view of the individual 118, the image 134 may represent a straight on view of the individual 120 and the image 144 may represent a straight on view of the individual 122. The images 126, 136, 146 may represent left profiles of the individuals 118, 120, 122, respectively. These are just examples. It will be appreciated that the various views of each individual 118, 120, 122, and perhaps views with and without facial obstructions and/or other characteristics, may be organized in a similar manner. In some cases, facial images for a particular individual may be organized by whether they are wearing their hair up or down, have facial hair or are clean-shaven, whether or not they are wear jewelry, glasses and the like. In some cases, facial images for a particular individual may be organized by the size of the facial image in pixels, the relative brightness of the facial image, the relative contrast of the facial image, the relative back lighting of the facial image, the relative blurriness of the facial image and/or by any other suitable image parameter. These are just examples.

Figure 6:
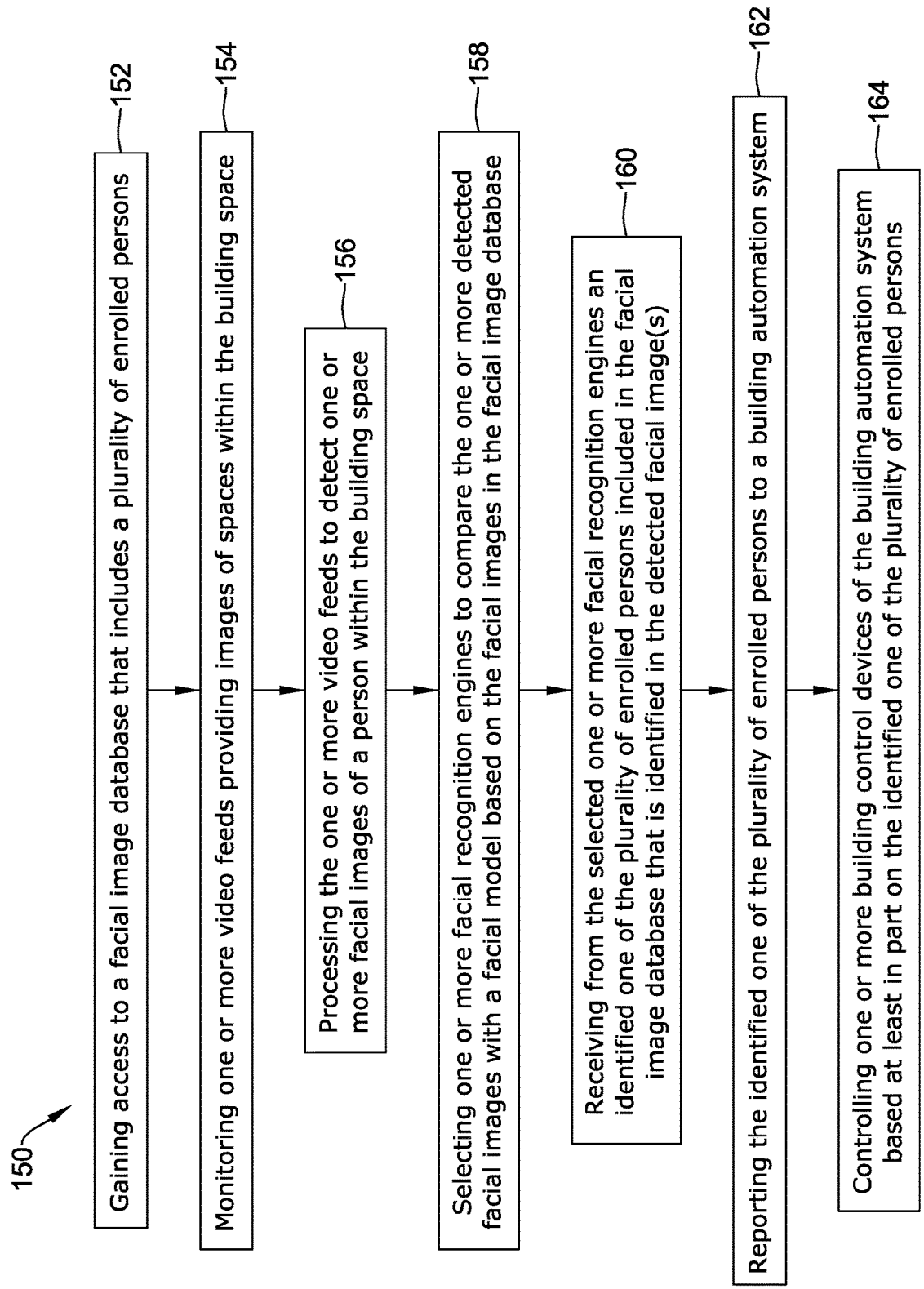
FIG. 6 is a flow diagram showing an illustrative method of recognizing individuals within a space.

FIG. 6 is a flow diagram showing an illustrative method 150 of recognizing individuals within or around a building space. As generally shown at block 152, access is gained to a facial image database (such as the facial images databases 16, 116) that includes a plurality of enrolled persons, where the facial image database includes a facial image for each of the plurality of enrolled persons under each of a plurality of different facial conditions. In some cases, the plurality of different facial conditions include two or more of the person looking up, the person looking down, the person looking to the left, the person looking to the right and the person looking straight ahead.

In some cases, the facial image database organizes the facial images for each of the plurality of enrolled persons at each of a plurality of different facial conditions into predetermined separate categories. Examples of the separate categories include one or more of the person with glasses, the person without glasses, the person with their hair worn up, the person with their hair worn down, the person clean shaven, the person not clean shaven, the person wearing jewelry, the person not wearing jewelry, and the person wearing a hat, the person not wearing a hat and the person wearing a scarf. In some instances, the separate categories include one or more of the person looking to the left, the person looking to the right, the person looking up, the person looking down, and the person looking straight ahead. In some cases, the separate categories may include the size of the facial image in pixels, the relative brightness of the facial image, the relative contrast of the facial image, the relative back lighting of the facial image, the relative blurriness of the facial image and/or by any other suitable image parameter. These are just examples.

One or more video feeds providing images of spaces within or around the building space may be monitored, at least some of the images include images of persons within the building space, as seen at block 154. As seen at block 156, the one or more video feeds may be processed to detect one or more facial images of a person within or around the building space. One or more facial recognition engines may be selected, as generally indicated at block 158. In some cases, selecting the one or more facial recognition engines is based at least in part on one or more image criteria of the one or more detected facial images. The one or more image criteria may include, for example, the size of the facial image in pixels, a relative brightness of the facial image, a relative contrast of the facial image, a relative back lighting of the facial image, a relative blurriness of the facial image and/or any other suitable image parameter(s). In some cases, the one or more image criteria may include whether the captured image shows the individual looking directly at the camera, or up or down and/or to the left or to the right. In some cases, the one or more image criteria may include whether and/or how much of the face is obstructed by a hat, hair, glasses or other object. Some facial recognition engines may perform better on facial images under certain image criteria than other facial recognition engines.

As seen at block 160, an identified one of the plurality of enrolled persons included in the facial image database that is identified in the one or more detected facial images may be received from the selected one or more facial recognition engines. The identified one of the plurality of enrolled persons may be reported to a building automation system, as generally seen at block 162, and one or more building control devices of the building automation system may be controlled based at least in part on the identified one of the plurality of enrolled persons, as indicated at block 164.

In some cases, the building automation system includes an HVAC system, and the building control device may include a building control user interface device that allows the identified one of the plurality of enrolled persons to change one or more building control parameters only when the identified one of the plurality of enrolled persons has been granted permission to change one or more building control parameters. In some instances, the building automation system includes an access control system, and a building access device is controlled to allow entry of the identified one of the plurality of enrolled persons only when the identified one of the plurality of enrolled persons has been granted permission to enter.

FIG. 7 is a flow diagram illustrating a method 170 of identifying an individual. In some cases, the method 170 includes creating a facial images database by soliciting facial images of each of a plurality of enrolled persons under each of a plurality of facial conditions that include one or more of the person looking to the left, the person looking to the right, the person looking up, the person looking down, and the person looking straight ahead. A video feed that provides a series of images of activity in or around a building is monitored, as indicated at block 174. One or more images may be extracted from the series of images of the video feed, as seen at block 176. The extracted one or more images may be analyzed to find facial images, as indicated at block 178, and are quantified to find a queryable facial image, as noted at block 180.

As indicated at block 182, one or more facial recognition engines may be selected based at least in part upon one or more image properties of the query-able facial image and the query-able facial image may be sent to the selected one or more facial recognition engines as indicated at block 184, where the selected one or more facial recognition engines are configured to compare the query-able facial image with facial models that are based upon facial images stored within the facial image database. As noted at block 186, facial recognition engine results that include an identity of a person shown within the query-able facial image as well as an associated confidence value may be provided. In some cases, and as indicated at block 188, one or more building control devices may be controlled based at least in part on the identity of the person shown within the query-able facial image.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A method of identifying an individual, the method comprising:
    monitoring a video feed that provides a series of images of activity in or around a building;
    extracting one or more images from the series of images of the video feed;
    analyzing the extracted one or more images to find facial images;
    quantifying the facial images to find a query-able facial image;
    selecting a first facial recognition engine from a plurality of facial recognition engines;
    sending the query-able facial image to the first facial recognition engine, the first facial recognition engine configured to identify whether the query-able facial image matches any of a plurality of enrolled persons included in a facial image database;
    the first facial recognition engine providing facial recognition results that include an identity of one of the plurality of enrolled persons shown within the query-able facial image as well as an associated confidence level in the identity of the identified person;
    when the associated confidence level in the identity of the identified person provided by the first facial recognition engine is below a threshold confidence level:
        selecting a second facial recognition engine from the plurality of facial recognition engines, the second facial recognition engine is different from the first facial recognition engine;
        the second facial recognition engine identifying whether the query-able facial image matches any of the plurality of enrolled persons included in the facial image database;
        the second facial recognition engine providing facial recognition results that include an identity of one of the plurality of enrolled persons shown within the query-able facial image as well as an associated confidence level in the identity of the identified person;
    when the second facial recognition engine identifies the same person as the first facial recognition engine:
        assigning a higher confidence level that is based at least in part on the confidence level of the first facial recognition engine and the confidence level of the second facial recognition engine; and
    controlling one or more devices based at least in part on the identity of the person identified by the first facial recognition engine and the second facial recognition engine.

2. The method of claim 1, comprising:
    ascertaining one or more facial image quality parameters of the query-able facial image; and
    selecting the first facial recognition engine from the plurality of facial recognition engines based at least in part on one or more of the ascertained facial image quality parameters, and selecting the second facial recognition engine from the plurality of facial recognition engines based at least in part on one or more of the ascertained facial image quality parameters.

3. The method of claim 2, wherein one or more of the facial image quality parameters are based at least in part on one or more of a size of the query-able facial image in pixels, a relative brightness of the query-able facial image, a relative contrast of the query-able facial image, a relative back lighting of the query-able facial image, a relative blurriness of the query-able facial image, what portion of the enrolled person's face is visible in the query-able facial image, and how much of the enrolled person's face is obscured in the query-able facial image.

4. The method of claim 1, comprising:
    ascertaining one or more facial image quality parameters of the query-able facial image; and
    selecting the first facial recognition engine from the plurality of facial recognition engines based at least in part on one or more of the ascertained facial image quality parameters.

5. The method of claim 4, wherein one or more of the facial image quality parameters are based at least in part on one or more of a size of the query-able facial image in pixels, a relative brightness of the query-able facial image, a relative contrast of the query-able facial image, a relative back lighting of the query-able facial image, a relative blurriness of the query-able facial image, what portion of the enrolled person's face is visible in the query-able facial image, and how much of the enrolled person's face is obscured in the query-able facial image.

6. The method of claim 1, wherein the facial image database comprises multiple facial images for each enrolled person, with some of the multiple facial images representing the enrolled person at one or more of different facial angles, different facial lighting, different facial size in terms of pixels, and different facial obstructions.

7. The method of claim 6, wherein the different facial obstructions comprise one or more of differing hair style, wearing glasses, not wearing glasses, wearing a hat, not wearing a hat.

8. The method of claim 1, wherein the facial image database comprises at least one facial image for each enrolled person, and wherein one or more of the facial recognition engines of the plurality of facial recognition engines include a facial model for each of the plurality of enrolled persons, wherein the facial model is based upon the at least one facial image of the respective enrolled person.

9. The method of claim 8, wherein at least one of the plurality of facial recognition engines identifying whether the query-able facial image matches any of the plurality of enrolled persons by comparing the query-able facial image with the facial models of the respective facial recognition engine.

10. A facial recognition system, comprising:
an input for receiving a video feed that includes a series of video images;
an output for sending control commands;
a memory for storing a facial image database, wherein the facial image database includes a plurality of entries each corresponding to a different enrolled person, and wherein each entry includes a person identifier along with one or more facial characteristics of the enrolled person;
a controller including a processor operatively coupled to the input, the output and the memory, the controller configured to:
  analyze the video feed to find a facial image;
  select a first facial recognition engine from a plurality of facial recognition engines;
  process the facial image using the first facial recognition engine, the first facial recognition engine configured to identify whether the facial image matches any of the plurality of enrolled persons included in the facial image database;
  the first facial recognition engine is configured to provide facial recognition results that include an identity of one of the plurality of enrolled persons shown within the facial image as well as an associated confidence level in the identity of the identified person;
  when the associated confidence level in the identity of the identified person provided by the first facial recognition engine is below a threshold confidence level, the controller is configured to:
    select a second facial recognition engine from the plurality of facial recognition engines, the second facial recognition engine is different from the first facial recognition engine;
    process the facial image using the second facial recognition engine, the second facial recognition engine is configured to identify whether the facial image matches any of the plurality of enrolled persons included in the facial image database;
    the second facial recognition engine is configured to provide facial recognition results that include an identity of one of the plurality of enrolled persons shown within the facial image as well as an associated confidence level in the identity of the identified person;
    when the second facial recognition engine identifies the same person as the first facial recognition engine:
      assign a higher confidence level that is based at least in part on the confidence level of the first facial recognition engine and the confidence level of the second facial recognition engine; and
      send one or more control commands via the output to control one or more devices based at least in part on the identity of the identified person identified by the first facial recognition engine and the second facial recognition engine.

11. The facial recognition system of claim 10, comprising:
ascertaining one or more facial image quality parameters of the facial image; and
selecting the first facial recognition engine from the plurality of facial recognition engines based at least in part on one or more of the ascertained facial image quality parameters.

12. The facial recognition system of claim 11, wherein one or more of the facial image quality parameters are based at least in part on one or more of a size of the facial image in pixels, a relative brightness of the facial image, a relative contrast of the facial image, a relative back lighting of the facial image, a relative blurriness of the facial image, what portion of the enrolled person's face is visible in the facial image, and how much of the enrolled person's face is obscured in the facial image.

13. A method of identifying an individual, the method comprising:
  analyzing a video feed to find a facial image;
  selecting a first facial recognition engine from a plurality of facial recognition engines;
  processing the facial image using the first facial recognition engine, the first facial recognition engine configured to identify whether the facial image matches any of the plurality of enrolled persons included in a facial image database;
  the first facial recognition engine providing facial recognition results that include an identity of one of the plurality of enrolled persons shown within the facial image as well as an associated confidence level in the identity of the identified person;
  when the associated confidence level in the identity of the identified person provided by the first facial recognition engine is below a threshold confidence level:
    selecting a second facial recognition engine from the plurality of facial recognition engines, the second facial recognition engine is different from the first facial recognition engine;
    processing the facial image using the second facial recognition engine, the second facial recognition engine configured to identify whether the facial image matches any of the plurality of enrolled persons included in the facial image database;
    the second facial recognition engine providing facial recognition results that include an identity of one of the plurality of enrolled persons shown within the facial image as well as an associated confidence level in the identity of the identified person;
  when the second facial recognition engine identifies the same person as the first facial recognition engine:
    assigning a higher confidence level that is based at least in part on the confidence level of the first facial recognition engine and the confidence level of the second facial recognition engine; and
    controlling one or more devices based at least in part on the identity of the person identified by the first facial recognition engine and the second facial recognition engine.

14. The method of claim 13, comprising:
ascertaining one or more facial image quality parameters of the facial image;
selecting the first facial recognition engine from the plurality of facial recognition engines based at least in part on one or more of the ascertained facial image quality parameters; and
selecting the second facial recognition engine from the plurality of facial recognition engines based at least in part on one or more of the ascertained facial image quality parameters.

* * * * *